United States Patent
Lien et al.

(10) Patent No.: US 10,060,209 B2
(45) Date of Patent: Aug. 28, 2018

(54) ESTIMATING CUTTINGS REMOVAL

(71) Applicant: Statoil Petroleum AS, Stavanger (NO)

(72) Inventors: Morten Lien, Jakobsli (NO); André Holm, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 15/515,050

(22) PCT Filed: Sep. 18, 2015

(86) PCT No.: PCT/NO2015/050167
§ 371 (c)(1),
(2) Date: Mar. 28, 2017

(87) PCT Pub. No.: WO2016/053108
PCT Pub. Date: Apr. 7, 2016

(65) Prior Publication Data
US 2017/0211345 A1    Jul. 27, 2017

(30) Foreign Application Priority Data
Sep. 29, 2014  (GB) .................................. 1417147.4

(51) Int. Cl.
| G01V 5/00 | (2006.01) |
| E21B 21/08 | (2006.01) |
| E21B 21/06 | (2006.01) |
| E21B 21/00 | (2006.01) |
| G01F 1/704 | (2006.01) |
| G01F 1/84 | (2006.01) |

(52) U.S. Cl.
CPC ............ *E21B 21/08* (2013.01); *E21B 21/001* (2013.01); *E21B 21/065* (2013.01); *G01F 1/7042* (2013.01); *G01F 1/8427* (2013.01)

(58) Field of Classification Search
CPC ........................................................ G01V 5/12
See application file for complete search history.

(56) References Cited

U.S. PATENT DOCUMENTS

| 4,413,511 A | 11/1983 | Godbey |
| 4,492,865 A | 1/1985 | Murphy et al. |
| 5,006,845 A | 4/1991 | Calcar et al. |
| 2012/0006613 A1 | 1/2012 | Tseytlin |

(Continued)

FOREIGN PATENT DOCUMENTS

| EP | 1 898 044 A2 | 3/2008 |
| GB | 2 344 180 A | 5/2000 |

(Continued)

*Primary Examiner* — Kiho Kim
(74) *Attorney, Agent, or Firm* — Birch, Stewart, Kolasch & Birch, LLP (57) ABSTRACT

A first property, derivable from mass, of a drilling fluid is measured at a point upstream of a cuttings removal device. A second property (also derivable from mass) is measured at a point downstream of the cuttings removal device. A difference between the properties is determined over a period of time to obtain an estimate of the rate of cuttings removal. This allows the property of the drilling fluid before and after cuttings removal to be compared to give an indication of the rate of cuttings removal, which is indicative of the borehole cleaning.

24 Claims, 5 Drawing Sheets (56) References Cited

U.S. PATENT DOCUMENTS

| | | | |
|---|---|---|---|
| 2013/0192841 A1 | 8/2013 | Feasey et al. | |
| 2014/0048331 A1 | 2/2014 | Boutalbi et al. | |
| 2014/0291023 A1* | 10/2014 | Edbury | E21B 44/00 175/24 |

FOREIGN PATENT DOCUMENTS

| | | |
|---|---|---|
| GB | 2 363 847 A | 1/2002 |
| GB | 2483671 A | 3/2012 |
| WO | WO 93/24811 A1 | 12/1993 |
| WO | WO 2012/016045 A1 | 2/2012 |

* cited by examiner

ESTIMATING CUTTINGS REMOVAL

FIELD OF THE INVENTION

The present invention relates to estimating a rate of cuttings removal from a borehole.

BACKGROUND

During borehole drilling, produced drill cuttings need to be transported to the surface in order to prevent their accumulation at the bottom of the borehole. Borehole cleaning requires efficient and fast removal of the cuttings, as inadequate borehole cleaning could cause significant drilling problems such as formation fracturing, excessive torque and drag. These can result in an increase in drilling costs.

Borehole cleaning is primarily achieved by the circulation of a drilling fluid. The drilling fluid removes the drilled materials from the borehole by carrying them to the surface. It also lubricates and cools the drill bit and stabilises the borehole by maintaining hydrostatic pressure within the borehole in order to prevent formation fluid entering the borehole.

Due to its role, various properties of the drilling fluid such as flow rate and annular fluid velocity, mud density and viscosity, and pressure changes have a strong effect on the efficiency of the borehole cleaning process, which is further influenced by the inclination angle of the borehole and properties of the cuttings.

By monitoring properties of the drilling fluid and the amount of cuttings brought to the surface, information can be obtained on the efficiency of the drilling and the rate of borehole cleaning.

One way to monitor the efficiency of borehole cleaning is to weigh the well cuttings that have passed through a shale shaker and estimate a volume of cuttings based on the measured weight. The volume can be compared with the theoretical volume of the borehole.

GB-A-2363847 discloses measuring fluid density and determining hole cleaning problems using differential pressure measurements. In a first embodiment two spaced apart sensors on the riser allow for a determination of the density of the well fluid, which is indicative of borehole cleaning efficiency. In a second embodiment a further set of sensors are provided to measure the drilling fluid as it enters the well.

SUMMARY

A problem with the types of process described above is that a certain amount of mud necessarily adheres to the cuttings and hence contributes to the overall weight. This leads to an inaccurate estimation of the amount of cuttings removed and leads to an inaccurate estimate of borehole cleaning. It is an object to provide a more accurate way of estimating borehole cleaning by providing a more accurate way of estimating a rate of cuttings removal from the borehole.

A first property of a drilling fluid (the property being derivable from mass) is measured at a point upstream of a cuttings removal device. A second property (also derivable from mass) is measured at a point downstream of the cuttings removal device. A difference between the properties is determined over a period of time to obtain an estimate of the rate of cuttings removal. This allows the property of the drilling fluid before and after cuttings removal to be compared to give an indication of the rate of cuttings removal, which is indicative of the borehole cleaning.

As an option, the first and second properties derivable from mass are selected from any of mass, weight, specific gravity, specific weight and density.

The first property derivable from mass of the drilling fluid is optionally measured using a gamma meter. An advantage of a gamma meter is that it can be retrofitted to equipment and is non-intrusive.

The second property derivable from mass of the drilling fluid is optionally measured using a coriolis meter. As an alternative the second property derivable from mass of the drilling fluid is measured using a mudpump, although this is less accurate than using a coriolis meter.

An optional example of the cuttings removal device is a shale shaker device.

An optional location to measure the first property derivable from mass is on a low pressure riser. This is typically the last point before the cuttings removal device where it can be guaranteed that the conduit is completely full of drilling fluid, although it will be appreciated that this property may be measured at any point before the cuttings removal device where it is known that the conduit will be completely full of drilling fluid.

According to a second aspect, there is provided an apparatus arranged to estimate a rate of cuttings removal from a borehole. The apparatus is provided with a first property measurement device arranged to measure a property derivable from mass of a drilling fluid upstream of a cuttings removal device. There is also provided a second property measurement device arranged to measure a second property derivable from mass of the drilling fluid downstream of the cuttings removal device. A computer device is provided that is arranged to determine a difference between the first and second properties derivable from mass over a period of time to obtain an estimate of the rate of cuttings removal.

Optional examples of the first and second properties derivable from mass are any of mass, weight, specific gravity, specific weight and density.

As an option, the first property measurement device is a gamma meter.

As a further option, the second property measurement device is a coriolis meter. Alternatively, the second property measurement device is a mudpump, although this provides a less accurate measurement than a coriolis meter.

The cuttings removal device is optionally a shale shaker device.

The first specific weight measurement device is optionally located on a low pressure riser.

According to a third aspect, there is provided a method of determining a flow velocity of a drilling fluid in a tubular. A property derivable from mass of the drilling fluid is measured at a first location. A first time is determined at which a variation in the property is detected. The same property is measured at a second location, the second location being located downstream of the first location, and a second time at which the variation in the property is detected is determined. The first and second times are used to determine the flow velocity using the determined first and second times.

Optional examples of the property derivable from mass include any of mass, weight, specific gravity, specific weight and density.

As an option, measuring the property of the drilling fluid at any of the first and second locations is performed using a gamma meter.

As an option, any of the first and second locations are located on a low pressure riser.

As a further option, the method comprises detecting a kick in the conduit by detecting a change in flow velocity.

The flow rate may optionally be determined using the determined flow velocity.

According to a fourth aspect, there is provided apparatus arranged to determine a flow velocity of a drilling fluid in a tubular, the apparatus comprising. The apparatus comprises a first device arranged to measure a property derivable from mass of the drilling fluid at a first location and determining a first time at which a variation in the property is detected. There is also provided a second device arranged to measure the property derivable from mass of the drilling fluid at a second location, the second location being located downstream of the first location, and determining a second time at which the variation in the property is detected. A computer device is arranged to determine the flow velocity using the determined first and second times.

As an option, any of the first and second devices comprises a gamma meter.

As an option, any of the first and second devices are located on a low pressure riser.

According to a fifth aspect, there is provided method of detecting a kick in a flow of drilling fluid in a tubular. The method comprises continuously or periodically measuring a property derivable from mass of the drilling fluid within the tubular, and detecting a variation in the property of more than a predetermined amount over a predetermined time period.

As an option, the method comprises measuring the property of the drilling fluid using a gamma meter.

As an option, the method comprises measuring the property at a location on a low pressure riser.

As an option, the property derivable from mass is selected from any of mass, weight, specific gravity, specific weight and density.

According to a sixth aspect, there is provided apparatus for detecting a kick in a flow of drilling fluid in a tubular. The apparatus comprises a measurement device arranged to continuously or periodically measure a property derivable from mass of the drilling fluid within the tubular. A computer device is arranged to detect a variation in the property of more than a predetermined amount over a predetermined time period.

According to a seventh aspect, there is provided computer software comprising machine readable instructions to perform the method described above in any of the first, third or fifth aspects.

According to an eighth aspect, there is provided computer device arranged to execute the computer software described above in the seventh aspect.

BRIEF DESCRIPTION OF THE DRAWINGS

Reference will now be made, by way of example, to the accompanying drawings, in which.

DETAILED DESCRIPTION

The following description refers to measuring specific weight and/or specific gravity. It will be appreciated that any related property derivable from mass may be used, such as mass, weight, specific weight, specific gravity and density.

Figure 1:
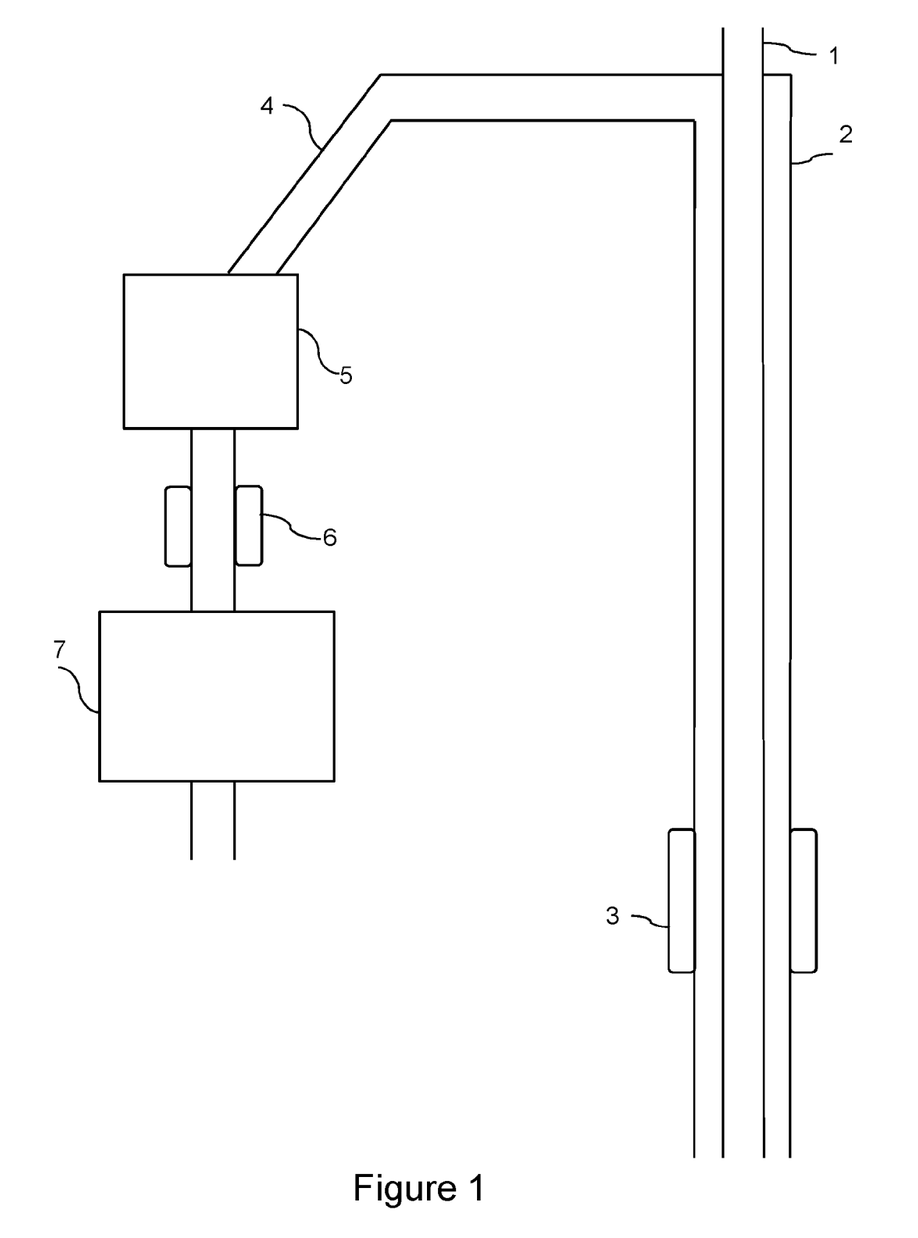
FIG. 1 illustrates schematically in a block diagram an exemplary apparatus to estimate a rate of cuttings removal.

Referring to FIG. 1, there is illustrated a first exemplary apparatus. A drill string 1 is located in a riser 2. A first specific weight measurement device 3 is located on the riser 2. It will be appreciated that any type of specific weight measurement device can be used in order to measure a specific weight of a fluid contained in the riser 2. By way of example, the following description refers to a gamma meter. An advantage of using a gamma meter to measure the specific weight of a drilling fluid contained in the riser 2 is that it is non-intrusive and can be retro-fitted to an existing riser 2, without direct contact with the drilling fluid.

As the drilling fluid travels up the riser, it exits the riser at a chute 5. From the chute, the drilling fluid enters a cuttings removal device 5. The cuttings removal device 5 removes cuttings contained in the drilling fluid. It will be appreciated that different types of cuttings removal device may be used. In the following description, the cuttings removal device 5 is referred to as a shaker. The shaker removes cuttings from the drilling fluid, and the remaining drilling fluid exits the shaker for recycling or removal.

A second specific weight measurement device 6 is located downstream of the shaker 5. This is used to measure the specific weight of the drilling fluid once the cuttings have been removed. Any suitable type of device may be used. By way of example, the second specific weight measurement device may be a coriolis meter. A coriolis meter gives an accurate measurement of the specific weight of the drilling fluid and, as the cuttings have been removed, is unlikely to become blocked by cuttings.

A mud pump 7 is also provided downstream of the shaker 6 to pump the drilling fluid. In one embodiment of the invention, the coriolis device is not provided. Instead, the current provided to the mud pump 7 is measured and used to obtain an estimate of the specific weight of the drilling fluid downstream of the shaker 5. Note that this is not a preferred embodiment, as the estimate obtained from the mud pump is not as accurate as a measurement obtained from the coriolis meter 6.

An estimate of borehole cleaning is obtained by determining the difference between the specific weight measurements provided by the first and second specific weight measurement devices 3, 6 over a period of time. As the first specific weight measurement is obtained before the cuttings are removed, this first measurement provides information on the total specific weight of the drilling fluid including the cuttings. Once the drilling fluid has progressed through the shaker 5, and the cuttings have been removed, the second specific weight measurement device 6 obtains a second specific weight measurement. By obtaining the difference between the first and second measurements over a period of time, the rate of cuttings removal can be estimated. Essentially, the difference between the specific weights of the drilling fluid with and without cuttings is obtained to determine the specific weight of the cuttings and thus to estimate the efficiency of borehole cleaning and the rate of cuttings removal.

The method described above can be expressed by the following equations, wherein by way of example, the first and second specific weight measurement devices respectively are a gamma meter and a coriolis meter, and these are used to determine the specific gravity, SG, of the drilling fluid:

$$\frac{SG_{gamma}}{t} - \frac{SG_{coriolis}}{t} = \frac{\Delta SG}{t} \qquad (1)$$

where
ΔSG is the specific gravity of the cuttings, typically around 2.6 sg;
$SG_{gamma}$ is the specific gravity of the drilling fluid with cuttings;
$SG_{coriolis}$ is the specific gravity of the drilling fluid without cuttings, typically around 1.5sg;

$$\frac{\Delta SG}{t}$$

measures the rate at which cuttings are removed from the borehole.

By way of example, the specific gravity of the cuttings is around 2.6 sg. This will vary by between 5 and 35%. The volume of cuttings in the mixture of cuttings and fluid is usually around 15%. This leads to:

$$SG_{gamma} \approx 85 \text{ vol \% fluid} \times 1.5 \text{ sg} + 15 \text{ vol \% cuttings} \times 2.6 \text{ sg} \qquad (2)$$

$$SG_{gamma} \approx 1.275 \text{ sg} + 0.39 \text{ sg} \approx 1.66 \text{ sg} \qquad (3)$$

Note that in order to accurately obtain the specific gravity (or specific weight) of the fluid, the volume of the conduit containing the fluids must be known. For example, the diameter of the low pressure riser is likely to be different to that of the tubular at which the coriolis meter 6 is located, and so the figures must be adjusted in order to compare the results.

Note also that integrating the rate of cuttings removal over time will lead to a measurement of the total mass of cuttings removed.

An advantage of this method is that a non-intrusive and continuous online estimate of the borehole cleaning process can be achieved, which can contribute to the optimisation of the drilling process. It can also provide information on the movement of the drilling fluid in the annulus.

Figure 2:
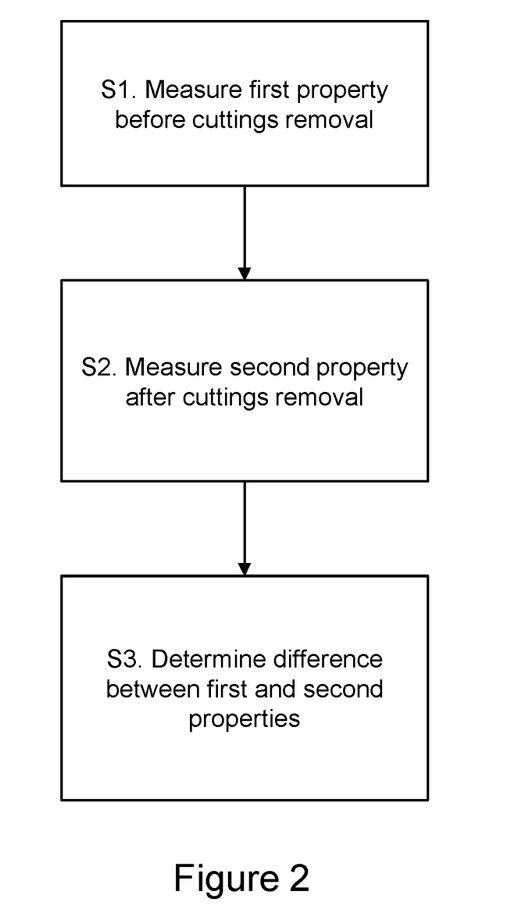
FIG. 2 is a flow chart showing a first exemplary method.

Turning now to FIG. 2, there is shown a flow diagram illustrating steps of the above described techniques. The following numbering corresponds to that of FIG. 2:

S1. A first specific weight of a drilling fluid is measured at a location upstream of the cuttings removal device 5. Typically this will be at the low pressure riser 2.

S2. A second specific weight of the drilling fluid is measured at a location downstream of the cuttings removal device 5 once the cuttings have been removed from the fluid.

S3. The difference between the first and second specific weights over a period of time is measured. This difference gives an estimate of the rate of cuttings removal, which can in turn be used to provide an indication of the efficiency of borehole cleaning.

The skilled person will appreciate that the invention is also capable of providing snapshot specific weight measurements rather than to provide such measurements continuously.

It will be appreciated that density or specific gravity measurements may be used in place of specific weight measurements.

Figure 3:
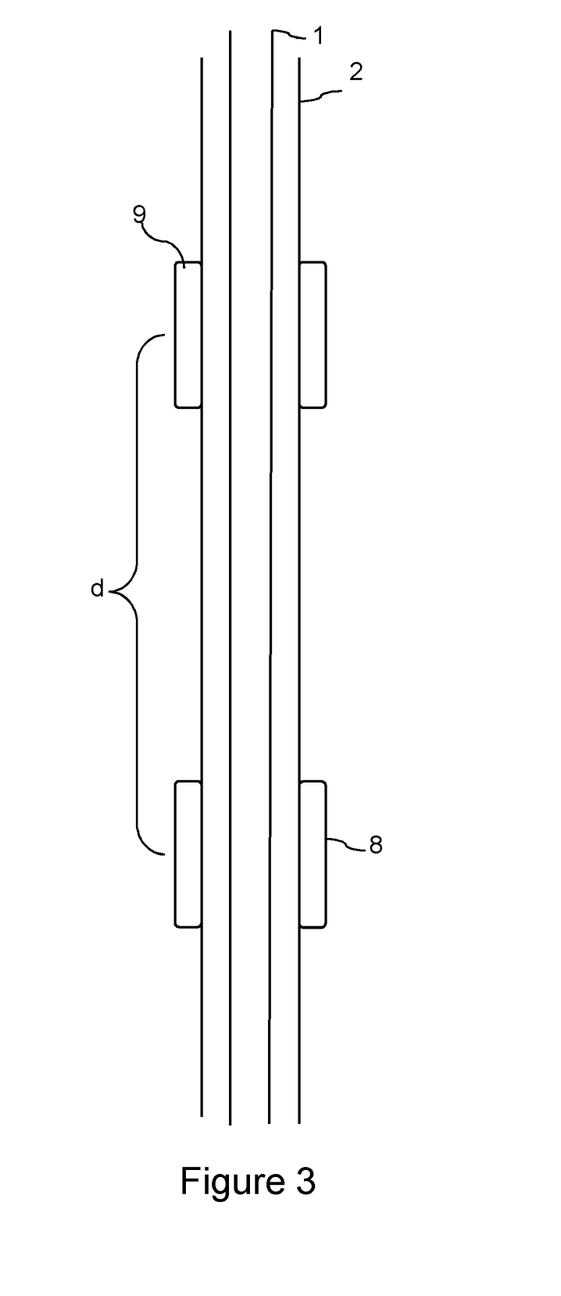
FIG. 3 illustrates schematically in a block diagram a further exemplary apparatus to monitor a drilling fluid.

In a second embodiment, as shown in FIG. 3, there is provided a further exemplary apparatus. A drill string 1 is located in a riser 2. A first device 8 arranged to measure a property of a drilling fluid and to determine a first time at which a variation in the property is detected is located on the riser 2. It will be appreciated that any type of device can be used in order to measure the property of the fluid contained in the riser 2. By way of example, the following description refers to a gamma meter. An advantage of using a gamma meter to measure the property of the drilling fluid contained in the riser 2 is that it is non-intrusive and can be retro-fitted to an existing riser 2 without having direct contact with the drilling fluid.

A second device 9 is located downstream of the first device 8 at a distance d from the first device. This second device is used to measure the property of the drilling fluid and to determine a second time at which a variation in the property is detected. Any suitable type of device may be used. By way of example, the second device may be a gamma meter. An advantage of using a gamma meter to measure the property of the drilling fluid contained in the riser 2 is that it is non-intrusive and can be retro-fitted to an existing riser 2 and has no direct contact with the drilling fluid.

The velocity of the drilling fluid is calculated as follows. A property of the drilling fluid is measured by the first device and the first time at which a variation in the property of the drilling fluid is detected by the first device is determined. The property of the drilling fluid is measured by the second device and the second time at which a variation in the property of the drilling fluid is detected by the second device is also determined. As velocity is given by the relationship elapsed time over distance, using the difference between the first and second times, and the known distance d between the locations of the first and second devices, the velocity of the drilling fluid can be calculated.

By way of example, the property of the drilling fluid that is measured could be specific weight. The first device measures the specific weight of the fluid and also determines the time at which variation in specific weight occurs. Variation in specific weight of a drilling fluid could be the result of, for example, change in the formation lithology, or degradation of the properties of the drill bit. The second device also measures the specific weight of the fluid and determines the time at which variation in specific weight occurs. By comparing the first and second times at which the variation was detected and using the distance between the first and second devices, the velocity of the drilling fluid can be calculated.

An advantage of the method described above is that it does not interfere with other operations, it provides a continuous monitoring capability of the drilling fluid velocity, and it can be implemented by utilising a non-intrusive apparatus, which has no direct contact with the drilling fluid.

Figure 4:
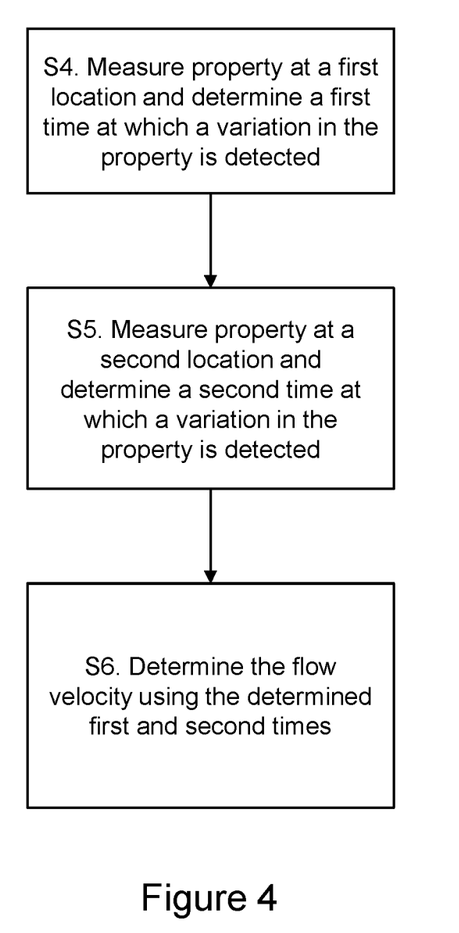
FIG. 4 is a flow chart showing a second exemplary method.

Turning now to FIG. 4, there is shown a flow diagram illustrating steps of the above described techniques. The following numbering corresponds to that of FIG. 4:

S4. A property of the drilling fluid is measured at a first location and a first time at which a variation in the property is detected is determined.

S5. The property of the drilling fluid is measured at a second location, and a second time at which a variation in the property of the drilling fluid is detected is determined.

S6. The flow velocity of the drilling fluid is determined using the first and second times and the distance d between the locations of the first and second measurements.

Note that in addition to measuring the flow velocity, other information can be derived. For example, a sudden increase in flow velocity could indicate a kick caused by, for example, gas entering a liquid hydrocarbon flow. Furthermore, changes in velocity can provide information about cuttings settling or a loss of drilling fluid.

In a third embodiment, only a single gamma meter (or other measuring device) is provided. In this case the property (e.g. specific weight or specific gravity) is continuously or periodically measured. Variations in the measured value will occur regularly, but if the variation is over a predetermined amount and within a predetermined time (in other words, a large and sudden variation) then this is indicative of a kick in the fluid flow. Note that the third and second embodiments can be easily combined to measure both fluid flow and to detect the presence of a kick.

Figure 5:
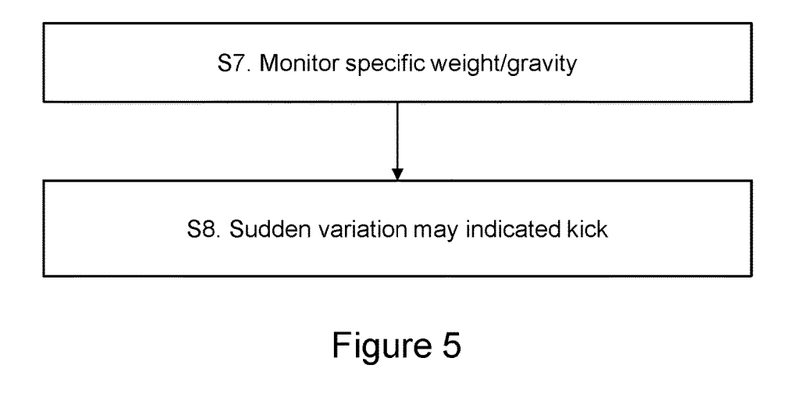
FIG. 5 is a flow chart showing a third exemplary method.

FIG. 5 is a flow diagram showing exemplary steps according to the third embodiment. The following numbering corresponds to that of FIG. 5:

S7. The specific weight or specific gravity of the fluid in a suitable location such as the low pressure riser is continuously or periodically monitored.

S8. If a sudden variation in the monitored property is detected that is greater than a threshold variation value and within a predetermined time period, then this is likely to be caused by a kick and the operator can be alerted to this fact.

Figure 6:
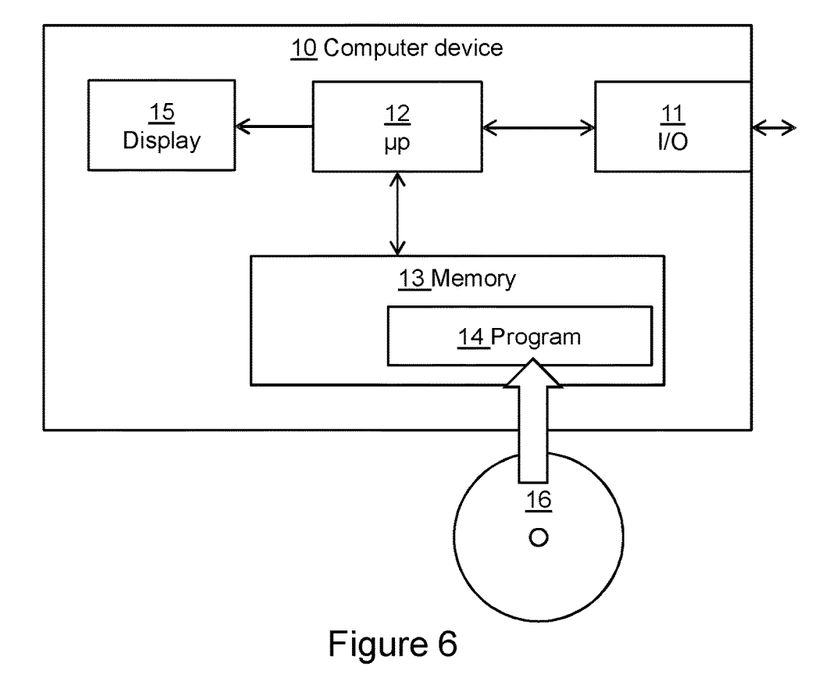
FIG. 6 illustrates schematically in a block diagram an exemplary computer device.

Referring to FIG. 6 there is provided an exemplary computer device 10, which is capable of executing the method to estimate the rate of cuttings removal as described by one embodiment of the invention. The computer device has an IN/OUT device 11 used for reading in specific weight measurement data obtained by the first and second specific weight measurement devices. The computer device 10 has a microprocessor 12 for processing the specific weight measurement data. In addition, the computer device 10 may be provided with a non-transitory computer readable medium in the form of a memory 13. The memory 13 may be used to store a computer program 14 which comprises computer readable instructions for obtaining the specific weight measurement data from the first and second specific weight measuring devices 3, 6 and for determining the difference between the first and second specific weight measurements. The microprocessor 12 is connected to the IN/OUT device 11 and memory 13, and is used for executing the computer program to determine the difference between the first and second specific weight measurements. The computer device 10 may include a display 15, which allows a user to visualise the specific weight measurement data.

The computer device 10 may be provided in a compact unit or may be a distributed system in which for example each of the individual components 11-15 are provided separately. Any or each such component may be provided in separate location and may communicate with one another over a data communication network, for example by cable or wirelessly. The memory 13 may comprise a portable storage medium which may contain the computer program or parts thereof. The medium may be an optical disk or memory stick or the like, which can be selectively connected or disconnected to the computer device 10 (for example through a wireless network) as required.

Note that the computer program 14 may be provided from an external source 16, such as a carrier wave, a compact disk or a flash drive.

Note that a similar computer device 10 may be used for the calculation of the time difference between detecting variation in a property of drilling fluid, as described in the second embodiment, or for detecting the presence of a kick, as described in the third embodiment. Note also that a single computer device 10 may be used to perform the methods of any combination of the three embodiments described above.

It will be appreciated by the person of skill in the art that various modifications may be made to the above-described embodiments without departing from the scope of the present invention. For example, while the above description refers to using a gamma meter and a coriolis meter to determine the specific weight of drilling fluid, it will be appreciated that any time of specific weight measuring device may be used.

The invention claimed is:

1. A method of determining a flow velocity of a drilling fluid in a tubular, the method comprising the steps of:
   measuring a property derivable from mass of the drilling fluid at a first location and determining a first time at which a variation in the property is detected;
   measuring the property derivable from mass of the drilling fluid at a second location, the second location being located downstream of the first location, and determining a second time at which the variation in the property is detected; and
   determining the flow velocity using the determined first and second times.

2. The apparatus according to claim 1, wherein the property derivable from mass is selected from any of mass, weight, specific gravity, specific weight and density.

3. The method as claimed in claim 1, further comprising the step of measuring the property of the drilling fluid at any of the first and second locations using a gamma meter.

4. The method as claimed in claim 1, wherein any of the first and second locations are located on a low pressure riser.

5. The method as claimed in claim 1, further comprising the step of detecting a kick at any of the first and second locations by detecting a change in flow velocity.

6. The method as claimed in claim 1, further comprising the step of determining a flow rate using the determined flow velocity.

7. An apparatus arranged to determine a flow velocity of a drilling fluid in a tubular, the apparatus comprising:
   a first device arranged to measure a property derivable from mass of the drilling fluid at a first location and determining a first time at which a variation in the property is detected;
   a second device arranged to measure the property derivable from mass of the drilling fluid at a second location, the second location being located downstream of the first location, and determining a second time at which the variation in the property is detected; and
   a computer device arranged to determine the flow velocity using the determined first and second times,
   wherein any of the first and second devices are located on a low pressure riser.

8. The apparatus as claimed in claim 7, wherein any of the first and second devices comprises a gamma meter.

9. A method of estimating a rate of cuttings removal from a borehole, the method comprising the steps of:
   making a first measurement of a property derivable from mass of a drilling fluid including cuttings upstream of a cuttings removal device;

making a second measurement of a property derivable from mass of the drilling fluid downstream of the cuttings removal device after the cuttings have been removed; and determining a difference between the first and second properties over a period of time by subtracting the second measurement from the first measurement to obtain an estimate of the rate of cuttings removal.

10. The method as claimed in claim 9, wherein the first and second properties derivable from mass are selected from any of mass, weight, specific gravity, specific weight and density.

11. The method as claimed in claim 9, further comprising the step of measuring the first property derivable from mass of the drilling fluid using a gamma meter.

12. The method as claimed in claim 9, further comprising the step of measuring the second property derivable from mass of the drilling fluid using a coriolis meter or a mudpump.

13. The method as claimed in claim 9, wherein the cuttings removal device is a shale shaker device.

14. The method as claimed in claim 9, further comprising the step of measuring the first property derivable from mass on a low pressure riser.

15. The method as claimed in claim 9, comprising the step of integrating the rate of cuttings removal over time to calculate the total mass of cuttings removed.

16. An apparatus arranged to estimate a rate of cuttings removal from a borehole, the apparatus comprising:
a first property measurement device arranged to measure a property derivable from mass of a drilling fluid including cuttings upstream of a cuttings removal device;
a second property measurement device arranged to measure a second property derivable from mass of the drilling fluid downstream of the cuttings removal device after the cuttings have been removed; and
a computer device arranged to determine a difference between the first and second properties derivable from mass over a period of time by subtracting the second measurement from the first measurement to obtain an estimate of the rate of cuttings removal.

17. The apparatus according to claim 16, wherein the first and second properties derivable from mass are selected from any of mass, weight, specific gravity, specific weight and density.

18. The apparatus as claimed in claim 16, wherein the first property measurement device comprises a gamma meter.

19. The apparatus as claimed in claim 16, wherein the second property measurement device is selected from the group consisting of a coriolis meter and a mudpump.

20. The apparatus as claimed in claim 16, wherein the cuttings removal device is a shale shaker device.

21. The apparatus as claimed in claim 16, wherein the first specific weight measurement device is located on a low pressure riser.

22. A method of detecting a kick in a flow of drilling fluid in a tubular, the method comprising the steps of:
continuously or periodically measuring a property derivable from mass of the drilling fluid within the tubular, the property derivable from mass being selected from any of mass, weight, specific gravity, specific weight and density; and
detecting a variation in the property of more than a predetermined amount over a predetermined time period to directly detecting the kick in the flow of drilling fluid.

23. The method as claimed in claim 22, further comprising the step of measuring the property of the drilling fluid using a gamma meter.

24. The method as claimed in claim 22, further comprising the step of measuring the property at a location on a low pressure riser.

* * * * *